US007281013B2

(12) United States Patent
Chaudhuri et al.

(10) Patent No.: US 7,281,013 B2
(45) Date of Patent: Oct. 9, 2007

(54) WORKLOAD ANALYSIS TOOL FOR RELATIONAL DATABASES

(75) Inventors: Surajit Chaudhuri, Redmond, WA (US); Vivek Narasayya, Redmond, WA (US); Omer Zaki, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 10/161,397

(22) Filed: Jun. 3, 2002

(65) Prior Publication Data

US 2003/0225768 A1   Dec. 4, 2003

(51) Int. Cl.
*G06F 17/30* (2006.01)
(52) U.S. Cl. .......................... 707/101; 707/100; 707/2; 707/10
(58) Field of Classification Search .............. 707/2, 707/10, 3–5, 100, 101
See application file for complete search history.

(56) References Cited

U.S. PATENT DOCUMENTS

| 5,960,423 | A * | 9/1999 | Chaudhuri et al. ............ 707/2 |
| 6,598,038 | B1 * | 7/2003 | Guay et al. .................... 707/2 |
| 6,601,062 | B1 * | 7/2003 | Deshpande et al. ............ 707/3 |
| 2001/0037345 | A1 * | 11/2001 | Kiernan et al. ............. 707/513 |
| 2003/0065648 | A1 * | 4/2003 | Driesch et al. ................. 707/2 |

OTHER PUBLICATIONS

Gunderloy, M., "Precise/Indepth for SQL Server", Aug. 2002, Redmondmag.com.
Woodie, A., "Centerfield Addresses DASD Spikes at Protective Shell", May 28, 2002, vol. 2, No. 20, OS/400 Edition, Midrange Stuff.
Arbi, Z., "BMC's 'PATROL' good for your applications", Jun. 5, 2000, Jakarta Post 9.
"CA's New Unicenter Database Management Solutions Greatly Simplify Management of Enterprise-Wide Database Environments", 2002, PR Newswire, Computer Associates International,.
"The Paradyn Parallel Performance Measurement Tool", Barton P. Miller, Mark D. Callaghan, Jonathan M. Cargille, et al., University of Wisconsin, Madison, Nov. 1995, pp. 37-46, from IEEE.
Data Management, Exploration & Mining, "AutoAdmin: Self-Tuning and Self-Administering Databases", Sanjay Agrawal, et al.
"DB2 Advisor: An Optimizer Smart Enough to Recommend Its Own Indexes", Gary Valentin, Michael Zuliani, Daniel C. Zilio, Guy Lohman and Alan Skelley, IEEE, pp. 101-110, copyright 2000.

* cited by examiner

*Primary Examiner*—Jeffrey Gaffin
*Assistant Examiner*—CamLinh Nguyen

(57) ABSTRACT

A method for providing workload information in a structured workload information data structure format that is organized according to a workload schema to be conducive to a given end usage of the information. The structured workload information can be made accessible using standard database analytical server applications to facilitate ad-hoc querying of the structured workload information to summarize and analyze the database workload or to facilitate exchange of workload information. A structured workload information (SWI) is constructed according to a SWI schema to facilitate a desired end usage of the workload information. The query information is extracted from the workload and stored in a structured workload information (SWI) data structure according to the schema based on the desired end usage of the information such as ad hoc querying or information exchange. The query information may be stored in a relational database having query information organized as a central fact table and a collection of hierarchical dimension tables or as an OLAP cube featuring hierarchical dimensions that arrange the query information in dimensions having objects ordered as a function of granularity or the information may be stored according to an XML schema wherein units of query information are separated by XML tags that identify a type of workload information.

31 Claims, 4 Drawing Sheets

WORKLOAD ANALYSIS TOOL FOR RELATIONAL DATABASES

TECHNICAL FIELD

The invention relates general to the field of database systems and more specifically to the field of workload analysis for database systems.

BACKGROUND OF THE INVENTION

Today's enterprises are widely deploying commercial relational database systems as back-ends for storing and retrieving large amounts of data. One of the important tasks of a database administrator (DBA) is to ensure that good performance is achieved over time. The ability of a DBA to make informed decisions that impact performance depends heavily on being able to understand the nature of the workload (queries and updates faced by the system). While most commercial relational database systems have tools for logging queries and updates that run against the server, existing aids for summarizing, analyzing, and exchanging the workload within and across organizations are inadequate. In particular, the exchange of workload information is cumbersome due to the lack of a common schema upon which to base the exchange of workload information as well as the complexity of workload information.

The ability to efficiently leverage information about the workload of a relational database can assist a DBA in finding under-performing queries, analyzing resource usage, and evaluating the quality of a given query optimizer. To identify an under-performing query, the DBA can search out queries that take a long time to execute and/or spend a significant amount of time scanning the base tables. Or the DBA can identify queries that are I/O intensive and tune the disk layout of the database to better accommodate the identified queries. In addition, a DBA may be interested in detecting users who execute the most queries or identify databases that are accessed most often. The DBA can evaluate the quality of a query optimizer by comparing actual cost to that predicted by the optimizer. Although the workload contains a wealth of information that is useful to a DBA, the exchange of such information is difficult and due to the complexity of existing database workload analysis techniques, most DBAs are limited to performing preprogrammed or "canned" reports on their databases.

For example, Paradyn is a performance measurement tool for parallel and distributed programs. It is designed to scale to long running programs (hours or days) and large (thousand node) systems. It can provide performance data down to the procedure or statement level. Paradyn supports dynamic instrumentation and uses a structure search methodology to automate finding performance bottlenecks. While Paradyn can provide meaningful information to the interested DBA, the querying model over the gathered information is technically advanced and not susceptible to ad hoc querying by a relatively unskilled user. Other commercially available performance analysis tools provide canned reports but offer little flexibility to an end user. These tools include PreciseSoft for Oracle, Centerfield and BMC for IBM AS/400, and Platinum for SQL server database systems.

SUMMARY OF THE INVENTION

Schema can be provided to structure workload information for many purposes such as analysis or information exchange. Providing workload information structured according to the schema in a structured workload information (SWI) format that is accessible using standard data analysis and exchange techniques enhances the usefulness of the workload information.

In a relational database system upon which queries are executed and having a workload made up of a series of logged queries and associated query information, a structured workload information (SWI) is constructed that facilitates a desired use of the workload information such as database system analysis or information exchange. The query information is extracted from the workload and stored in the structured workload information (SWI) according to a predetermined schema. Information may be extracted from the workload by accessing a query plan for each query in the workload.

According to a feature of one embodiment, the predetermined schema is selected based on an analysis server application that will be used to access the structured workload information (SWI). The predetermined schema may be hierarchical in nature, such that objects in the schema are arranged in dimensions and objects in a dimension are ordered based on a degree of granularity. The query information may be stored in a relational database having query information organized as a central fact table and a collection of hierarchical dimension tables.

In one embodiment, the predetermined schema directs that workload data be stored as an OLAP cube featuring hierarchical dimensions that arrange the query information in dimensions having objects ordered as a function of granularity. The cube may have a dimension for at least one of the following query information for each query in the database workload: data objects accessed by the query, a time the query occurred, a user submitting the query, machine on which the query was submitted, a type of query, physical operators included in the query or an associated query plan, or a nature of predicates in the query.

In an embodiment directed to facilitating information exchange, the query information includes a plurality of units of information and the query information is stored after appending identifying tags to each of the units of information. The information may be stored according to an XML schema wherein the units of information are separated by XML tags that identify at least one of the following types of workload information: SQL string for the query, query category, a list of tables and columns referenced or updated by the query, total optimizer estimated cost, estimated cardinality of the query, a sequence and logical and physical operators and their arguments used in a query plan.

These and other objects, advantages, and features of the invention will be better understood from the accompanying detailed description of preferred embodiments of the invention when reviewed in conjunction with the accompanying drawings.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Exemplary Operating Environment

Figure 1:
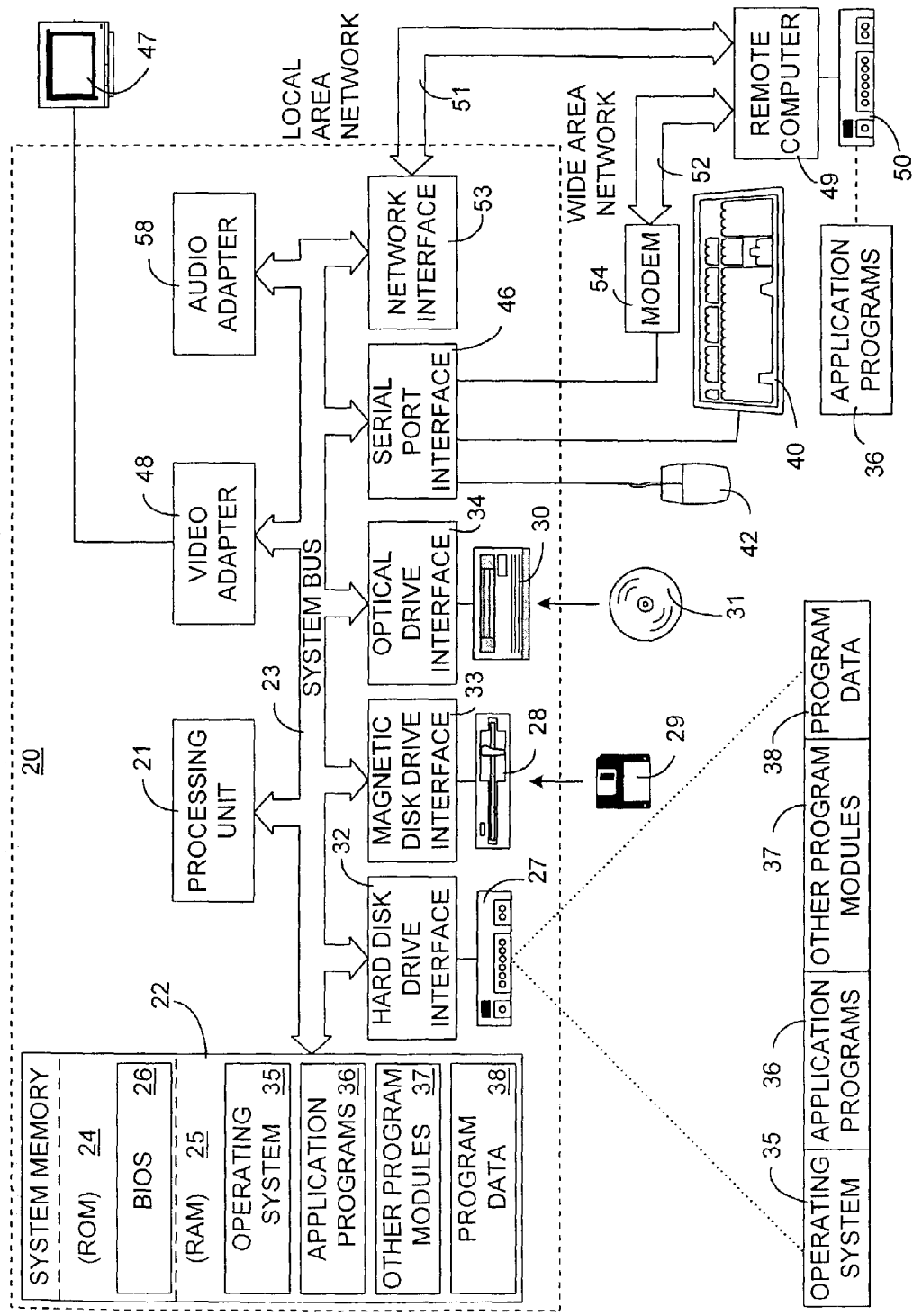
FIG. 1 illustrates an exemplary operating environment for a system for constructing a structured workload information (SWI)

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38, A database system may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Structured Workload Information (SWI)

Figure 2:
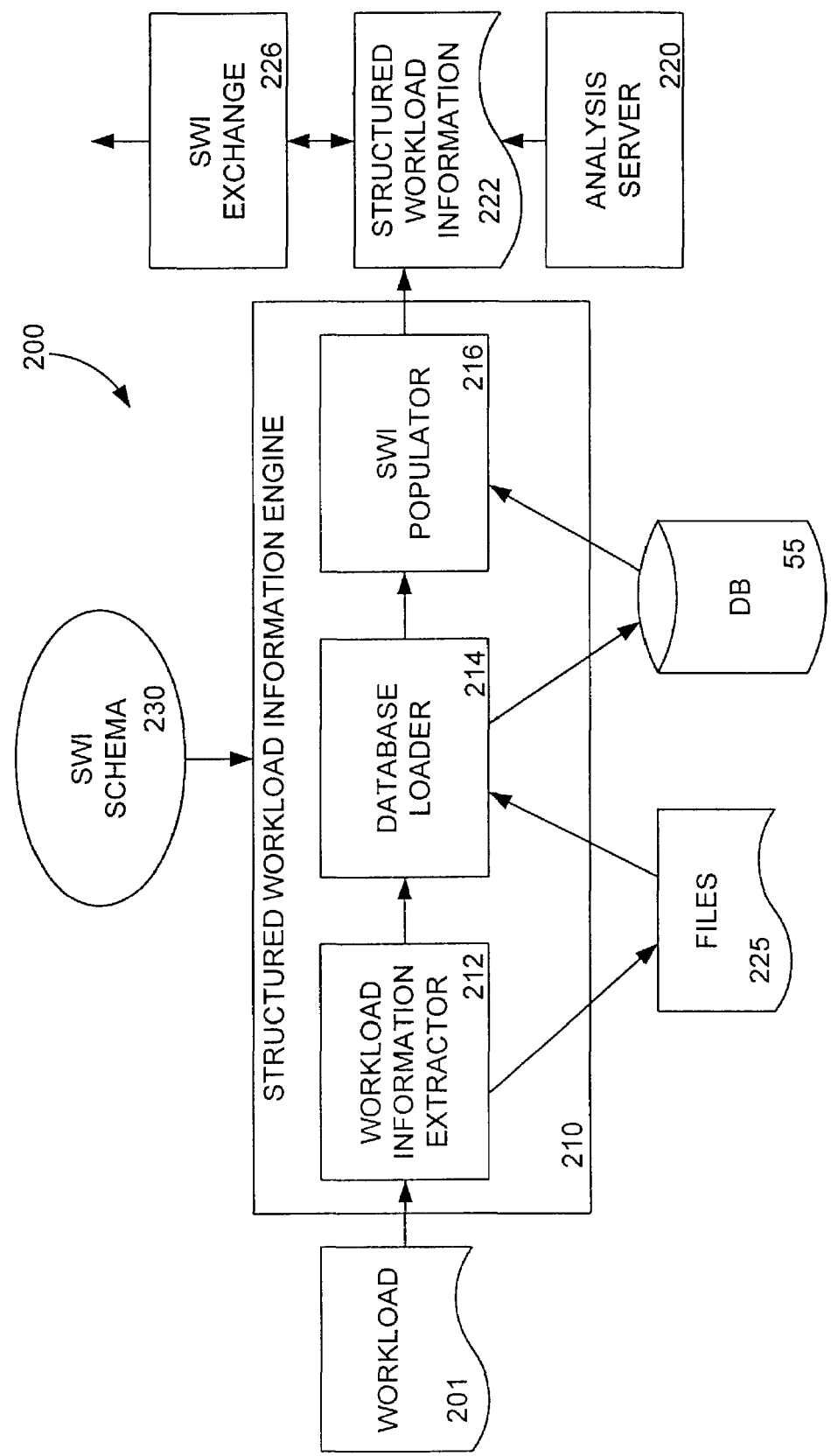
FIG. 2 is a block diagram of a system for constructing a structured workload information (SWI) according to an embodiment of the present invention.

Referring now to FIG. 2, an architectural overview of a method 200 for constructing a structured workload information (SWI) 222 data structure according to a SWI schema 230 is shown. The method 200 may be stored as part of an application program 36 (FIG. 1). The SWI schema is built according to the use that will be made of the SWI. For example, one SWI schema imposes a structure on the workload information that makes it conducive to analysis and ad hoc querying, while another SWI schema imposes a structure that facilitates exchange of the workload information.

To construct the structured workload information, a workload 201 in the form of a file or table containing a sequence of SQL queries and updates is input to a structured workload information engine 210. The workload information engine 210 is specifically adapted according to the SWI schema that is input to the structured workload information engine 210. The workload that is input to the structured workload information engine 210 can be obtained using the event logging capabilities of modern commercial database systems such as the Profiler in Microsoft SQL Server. The structured workload information engine 210 produces as output the structured workload information (SWI) 222 that is organized according to the SWI schema 230. For the purposes of this description, the SWI schema 230 is an OLAP or XML schema, however, any schema that can be used to transform the workload information into a data structure that is useful to an end user is contemplated by the present invention.

In an exemplary embodiment, the structured workload information (SWI) 222 is a data cube that is structured in a hierarchical fashion by the SWI schema and stored in an OLAP database using Microsoft Analysis Server. The data cube contains information about the given workload, organized in a multidimensional format that makes it easy to summarize and analyze the workload in different ways. For example, the standard cube browsing and querying tools that accompany Microsoft Analysis Server to summarize and analyze the workload can be used. In another exemplary embodiment, the SWI schema structures the workload with XML tags so that the SWI is easily exchanged between remote computers.

The structured workload information engine 210 consists of two components and a third optional component. A workload information extractor 212 extracts relevant information from the workload (also called a "trace"). What information is "relevant" is determined by the intended use of the structured workload information (SWI). Three potential uses for the structered workload information are 1) performance analysis of queries, updates; 2) resource usage; and 3) query optimizer quality. The OLAP cube schema is designed to support these tasks, and information from the trace that is required to build the OLAP cube is extracted by the workload information extractor 212. In general, the workload may contain information that is not relevant for the desired tasks, and furthermore, the required information may not be readily available in the desired form. For example, in a trace file obtained from Microsoft SQL Server Profiler, each event in the trace file contains several fields EventClass, TextData, Application Name, HostName, NTUserName, LoginName, CPU, Reads, Writes, Duration, . . . ). Therefore, it is important that the workload information extractor 212 efficiently extracts the relevant information from the workload.

The workload information extractor 212 reads events from the workload one at a time and stores necessary data in files 225 to be used by the structured workload information engine 210. For each event, the extractor extracts information about the user issuing the query, the machine from which the event was generated, the duration of the event (.i.e., the time taken to execute the query) and the time at which the event occurred, directly from fields in the event. However, all other relevant information about the event (e.g., the type of the statement, which tables were referenced in the query/update, the query optimizer's estimate of the execution time of the query etc.) is not directly available from the trace file. The workload information extractor 212 extracts this information by examining the plan of the query in the event (the actual query string is available in the TextData field of the event). The plan of a query, which is determined by the query optimizer component of the database server, is the sequence of steps (called operators) taken by the database server to actually execute the query. The ability to obtain the plan of a query without actually executing it is a standard feature in today's relational database systems, and is important since it makes it possible for the structured workload information engine 210 to efficiently extract the required information.

In Microsoft SQL Server, the Showplan interface provides the ability to obtain the plan of a query. Along with each operator in the plan, Showplan provides additional information such as the estimated cost of executing the operator, the estimated cost of executing the sub-tree at the operator, the type of the operator (e.g., Table Scan, Index Scan, Merge Join, Sort, etc. . . ), the estimated number and size of the rows passing through each operator, etc. By examining the plan, the workload information extractor 212 extracts the required information (e.g. which tables are referenced, the type of join method used, the total estimated cost of the query, etc. . . . ). The extractor 212 is efficient because for each event in the workload, it needs to invoke the Showplan interface only once, and never executes any queries. The information extracted in this step is saved into files, so that subsequent modules can process it later. if the kinds of analysis supported by the structured workload information 222 needs to be augmented such as by adding a new dimension in the OLAP schema, the extractor 212 needs to be augmented to extract the necessary additional information.

An optional component in the structured workload information engine 210 is a database loader 214. The database loader loads the information extracted by the workload information extractor 212 into a relational database 55 with a generic (pre-defined) schema. Loading the information into a relational database enables a sophisticated user to directly query this information and obtain advanced analysis that may not be possible with a more restrictive model such as OLAP or XML. In addition, other structured workload information (SWI) data structures may leverage the relational database schema.

Figure 3:
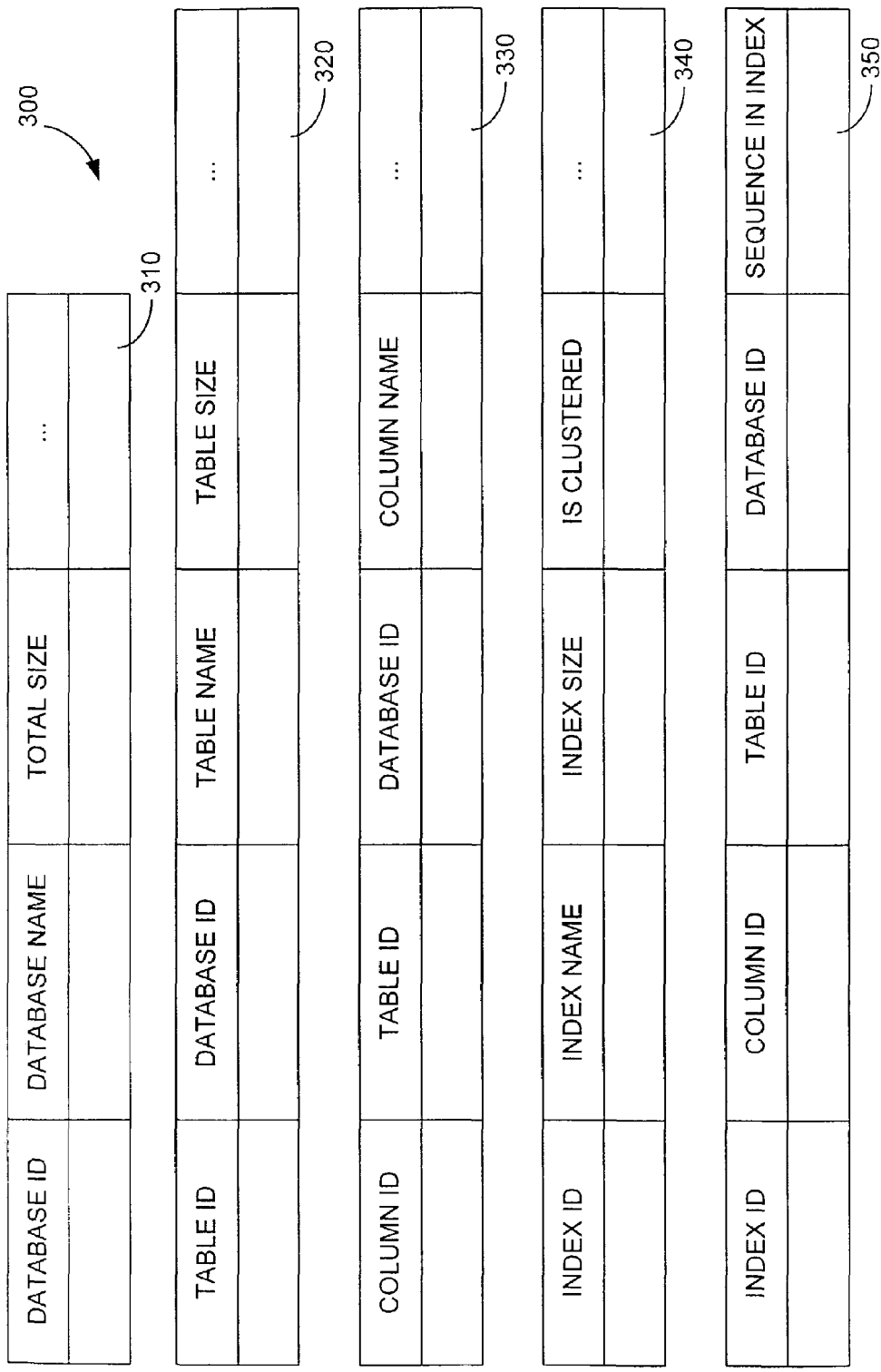
FIG. 3 is a block diagram of a schema for storing a workload summary in a relational database according to an embodiment of the present invention.

One example of a schema 300 that can be used for storing workload information in a relational database is shown in FIG. 3. The schema of the relational database created by the database loader 214 (FIG. 2) is a schema required for multidimensional analysis, and is organized as a central fact table and a collection of hierarchical dimension tables. FIG. 3 shows the schema of tables for modeling the "Data Objects" dimension hierarchy consisting of the database object 310, the table object 320, the column object 330, and the index object 340, 350. An index is defined over a sequence of columns of a table and therefore the information about the index is stored in normalized form in two separate tables 340, 350.

Referring back to FIG. 2, a SWI populator 216 is employed to create a structured workload information (SWI) 222 for access by an analysis server 220. In this described embodiment, the structured workload information (SWI) 222 is an OLAP cube stored in an OLAP database on the analysis server. The data for populating the cube either comes from the files created by the workload information extractor 212 or the relational database 55 (if the database loader 214 is used). The structured workload information (SWI) populator 216 uses standard OLE-DB interfaces to create and populate the cube, can therefore be used against any OLAP server (i.e., it is not restricted to Microsoft Analysis Server). Once the cube has been built, the user can leverage client tools that ship with the standard analysis server, such as a cube browser, to view and query the cube. Users may also employ other more sophisticated analysis tools such as data mining tools that also accompany the analysis server. For example, a DBA can build a decision tree over the OLAP cube to model expensive queries.

Figure 4:
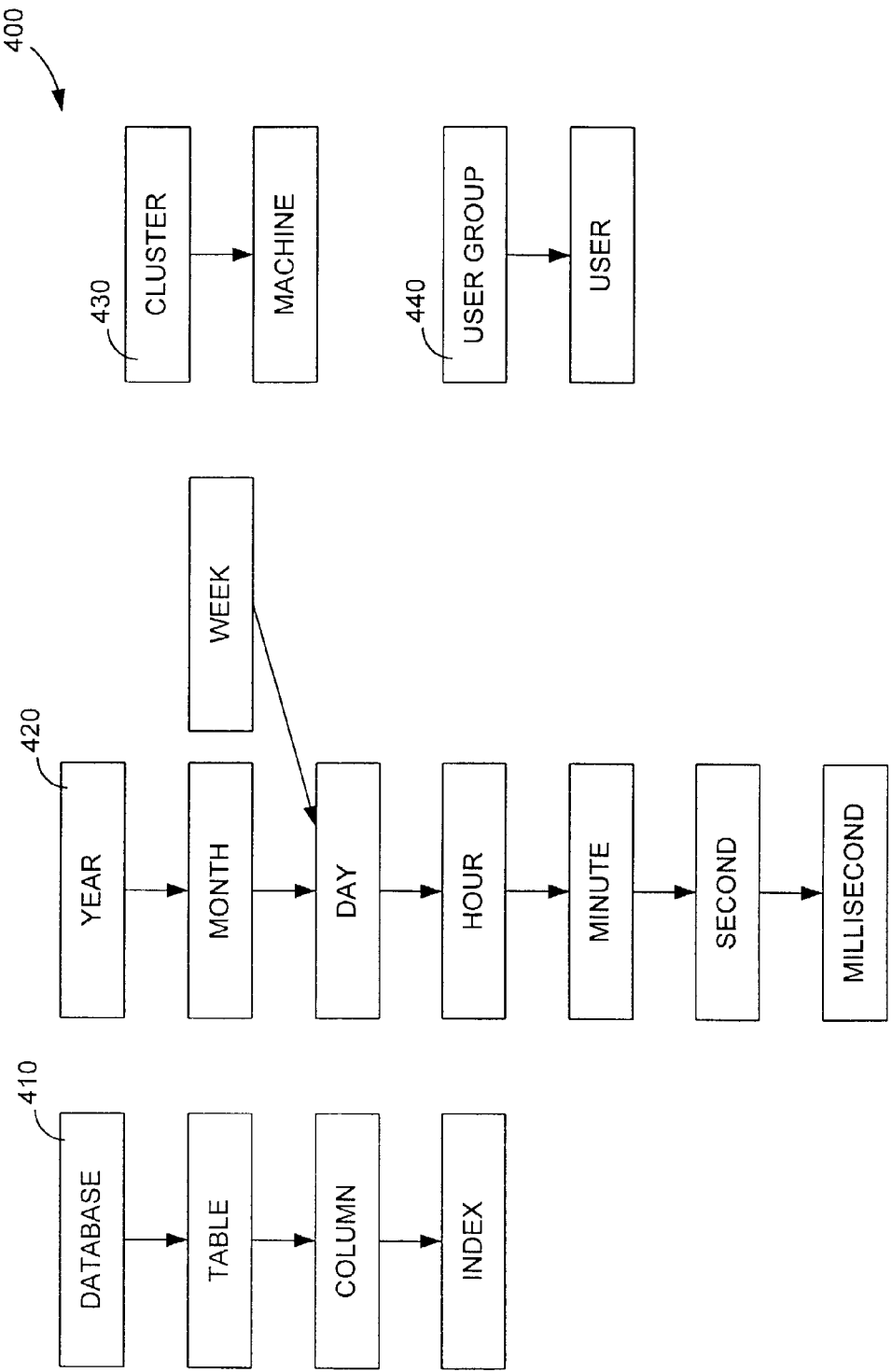
FIG. 4 is a block diagram of a schema for storing a workload summary in schema corresponding to an OLAP cube according to an embodiment of the present invention.

By default, the structured workload information 222 includes several dimensions in the data cube created by the structured workload information engine 210. Each dimension is organized in a hierarchy to allow drill-down from coarse-grained analysis to progressively more fine-grained analysis. FIG. 4 depicts several dimensions that might be featured as default dimensions in an OLAP schema 400 for storing workload data as an OLAP cube.

In the OLAP cube, a dimension for data objects 410 consists of databases, tables, columns, and indexes and allows analysis of the workload with respect to a specified set of objects. For example, this dimension allows analyzing the average execution time of all queries that reference a given table T. A time dimension 420 consists of year, month, day, hour minute, second, and millisecond. This dimension allows temporal analysis. For example, this dimension provides an answer to a question about the number of queries that executed in a given interval of time. A user dimension 440 consisting of user and user group provides information such as a breakdown of how many times the user referenced each database. A machine dimension consists of machine cluster and machine. This dimension allows analysis of measures on a cluster of machines or single machine.

Other single level dimensions not shown mavalso be provided in the OLAP cube. A query type dimension can contain values such as SELECT, INSERT, UPDATE, and DELETE. A physical operator dimension allows the user to analyze the workload based on the execution plans of the queries and can contain the value of any physical operator that can appear in an execution plan. For example, this dimension can be used to analyze how often a Mergejoin operator was used vs. a HashJoin operator. Such information can be valuable to designers of a database system. A predicates dimension allows categorization of queries by the nature of the predicates in the queries. For example, the information in this dimension provides answers to questions such as: "How many queries in the workload contained equality selection predicates on table?" and "What is the average execution time of all queries that contained one or more join predicates?"

The dimensional hierarchies can be used to drill down or up to obtain finer or coarser granularity of analysis as desired. For example, the most frequently referenced table in the database can be found and then by drilling down, the most frequently referenced column of the table can then be found. Also, since OLAP supports multi-dimensional analysis, the data can be analyzed by two or more dimensions simultaneously. For example, for each database (dimension (a)), the workload can be analyzed by each query type (dimension (e)). Also, the addition of new dimensions or removal of existing dimensions is permitted by the flexible OLAP model.

Measures that are automatically defined in the OLAP cube are 1) the number (count) of statements, 2) the total execution time of each statement, 3) the total CPU time of each statement, 4) the total I/O time of each statement, 5) the optimizer estimated time of each statement, and 6) the number of tables referenced. The model can be extended to include additional measures by adding them during the building of the cube.

In another embodiment, the SWI populator 216 creates a structured workload information (SWI) 222 according to a SWI schema 230 presented as an .xsd file to produce a SWI that is an .xml file. A structured workload information (SWI) according to this embodiment facilitates the exchange of the workload information across a corporate intranet or the Internet, shown generally as 226. The workload information can be transferred in this format from one computer for analysis by a remotely located analysis server 220. The SWI populator 216 utilizes an XML schema that describes the workload analysis information that is likely to be useful for the exchange of this information.

The content of the XML schema can be broadly classified as: (a) information obtained from syntactic analysis of a workload event; (b) information obtained from the execution plan generated by the query optimizer; and (c) information obtained during execution of the query. For the purposes of this description, the schema is defined in a file called WorkloadAnalysis.xsd, the contents of which follow as Table 1:

TABLE 1

```
<?xml version="1.0" encoding="utf-8" ?>
<xs:schema xmlns:xs="http://www.w3.org/2001/XMLSchema">
    <xs:annotation>
        <xs:appinfo>XML Schema for Workload Analysis</xs:appinfo>
        <xs:documentation>
This schema describes a specification for interchange of workload analysis data.
In the current design, a workload is assumed to be a sequence of SQL statements.
        </xs:documentation>
    </xs:annotation>
    <!--
*************************************************************************
    ** Root element of the schema.
    ** This schema can be extended by extending the Statement type
*************************************************************************
    -->
    <xs:element name="WorkloadAnalysisXML">
        <xs:complexType>
            <xs:sequence>
                <xs:element name="Event" type="EventType" minOccurs="0" />
            </xs:sequence>
        </xs:complexType>
    </xs:element>
    <!--
*************************************************************************
    ** Event and Statement Types. An event consists of a batch
    ** (i.e., sequence) of statements.
*************************************************************************
```

TABLE 1-continued

```
-->
  <xs:complexType name="EventType" >
    <xs:sequence>
      <xs:element name="Statement" type="StatementType" minOccurs="1" />
    </xs:sequence>
  </xs:complexType>
  <xs:complexType name="StatementType">
    <xs:annotation>
      <xs:documentation>
A statement type represents pertinent information about a SQL statement that can be used
for a variety of analysis.
      The information present here can be extended by adding more details that
      may be useful for other kinds of analysis. Currently, the information
      associated with a statement can be categorized as:
      (a) syntactic analysis of statement, i.e., parsing
      (b) plan information obtained by optimizing the statement, and
      (c) information gathered during execution of the statement.
      Syntactic (structural) information about statement:
      (1) SQL String for statement
      (2) Statement category: SELECT, INSERT, UPDATE, DELETE, OTHER (all
others)
      (3) List of tables, columns referenced/updated in statement
      (4) List of Projection columns
      (5) List of Group By columns
      (6) List of Order By columns
      (7) List of predicates trees consiting of AND/OR/NOT of atomic join and
selection conditions
      Plan information for the statement:
      1. Total optimizer estimated cost of executing the statement.
      2. Estimated cardinality of ouptut of statement.
      3. Sequence of logical and physical operators and their arguments used in the
plan.
      Execution Information for the statement:
      1. Actual cost of executing the statement.
      2. Actual cardinality of ouptut of statement.
      </xs:documentation>
    </xs:annotation>
    <xs:sequence>
      <!-- User Name submitting the statement -->
      <xs:element name="User" type="UserType" minOccurs="0" />
      <!-- Machine Name on which statement was submitted -->
      <xs:element name="Machine" type="MachineType" minOccurs="0" />
      <!-- Timestamp at which statement was submitted -->
      <xs:element name="StartTime" type="xs:dateTime" minOccurs="0" />
      <!-- Is Statement part of batch/stored procedure? -->
      <xs:element name="IsPartOfBatch" type="BooleanType" default="0"
minOccurs="0"/>
      <xs:element name="IsPartOfStoredProcedure" type="BooleanType"
default="0" minOccurs="0"/>
      <!-- Tables/Columns Referenced or Updated in statement -->
      <xs:element name="ReferencedTable" type="TableType" minOccurs="0" />
      <xs:element name="UpdatedTable" type="TableType" minOccurs="0" />
      <xs:element name="ReferencedColumn" type="ColumnType"
minOccurs="0" />
      <xs:element name="UpdatedColumn"type="ColumnType"minOccurs="0" />
      <xs:element name="ProjectionColumn"type="ColumnType"minOccurs="0"
/>
      <xs:element name="GroupByColumn"type="ColumnType"minOccurs="0" />
      <xs:element name="OrderByColumn"type="ColumnType"minOccurs="0" />
      <!-- Predicates (join/selection) in statement -->
      <xs:element name="PredicateTree"type="PredicateTreeType"minOccurs="0"
/>
      <!-- Operators used in plan for statement -->
      <xs:element name="Operator" type="OperatorType" minOccurs="0"/>
    </xs:sequence>
    <!-- SQL String for statement -->
    <xs:attribute name="StatementString" type="xs:string"/>
    <!-- Type of statement SELECT, INSERT, UPDATE, DELETE, OTHER -->
    <xs:attribute name="StatementCategory" type="EnumStatementCategory" />
    <!-- Optimizer vs. Execution information -->
    <xs:attribute name="OptimizerEstimatedCostInMS" type="xs:float"/>
    <xs:attribute name="OptimizerEstimatedCardinality" type="xs:unsignedLong"/>
    <xs:attribute name="ActualExecutionCostInMS" type="xs:float"/>
    <xs:attribute name="ActualCardinality" type="xs:unsignedLong"/>
  </xs:complexType>
  <!--
***********************************************************************
 ** User and Machine Types
***********************************************************************
```

TABLE 1-continued

```
-->
  <xs:complexType name="UserType">
    <xs:sequence>
      <xs:element name="UserName" type="NameType" minOccurs="1" />
      <xs:element name="UserGroupName" type="NameType" minOccurs="0" />
    </xs:sequence>
  </xs:complexType>
  <xs:complexType name="MachineType">
    <xs:sequence>
      <xs:element name="MachineName" type="NameType" minOccurs="1" />
      <xs:element name="MachineIPAddress" type="xs:string" minOccurs="0" />
      <xs:element name="MachineSubnetMask"type="xs:string" minOccurs="0" />
      <xs:element name="MachineGateway" type="xs:string" minOccurs="0" />
    </xs:sequence>
  </xs:complexType>
  <!--
**************************************************************
** Predicate information
**************************************************************
 -->
  <xs:complexType name="PredicateTreeType">
    <xs:sequence>
      <xs:element name="LogicalOp" type="LogicalOpType" minOccurs="0" maxOccurs="1"/>
      <xs:choice>
      <xs:element name="PredicateTree" type="PredicateTreeType" minOccurs="1" maxOccurs="2" />
      <xs:element name="Predicate" type="PredicateType" minOccurs="1" maxOccurs="2" />
      </xs:choice>
    </xs:sequence>
  </xs:complexType>
  <xs:complexType name="PredicateType">
    <xs:sequence>
      <xs:element name="LeftHandSize" type="ValRefType" minOccurs="1" maxOccurs="1"/>
      <xs:element name="ComparisonOperator" type="ComparisonOperatorType" minOccurs="1" maxOccurs="1"/>
      <xs:element name="RightHandSize" type="ValRefType" minOccurs="1" maxOccurs="1"/>
    </xs:sequence>
  </xs:complexType>
  <xs:complexType name="ValRefType">
    <xs:choice>
      <xs:element name="ColumnReference" type="ColumnType" minOccurs="1" maxOccurs="1"/>
      <xs:element name="Constant" type="ConstantType" minOccurs="1" maxOccurs="1"/>
    </xs:choice>
  </xs:complexType>
  <xs:complexType name="ConstantType">
    <xs:attribute name="Value" type="xs:string" />
  </xs:complexType>
  <xs:simpleType name="LogicalOpType">
    <xs:restriction base="xs:string">
      <xs:enumeration value="AND" />
      <xs:enumeration value="OR" />
      <xs:enumeration value="NOT" />
    </xs:restriction>
  </xs:simpleType>
  <xs:simpleType name="ComparisonOperatorType">
    <xs:restriction base="xs:string">
      <xs:enumeration value="EQ" />
      <xs:enumeration value="LE" />
      <xs:enumeration value="LT" />
      <xs:enumeration value="GE" />
      <xs:enumeration value="GT" />
      <xs:enumeration value="NE" />
    </xs:restriction>
  </xs:simpleType>
  <!--
**************************************************************
** Logical and Physical Operators that can appear in a plan. Note that the
** terminology used is what is currently employed in Microsoft SQL Server
** Showplan output. It is possible to extend the set of operators to those
** that are specific to other Database Management Systems.
**************************************************************
```

TABLE 1-continued

```
-->
  <xs:complexType name="OperatorType">
    <xs:sequence>
      <xs:element name="LogicalOperator" type="LogicalOperatorType" minOccurs="1" maxOccurs="1"/>
      <xs:element name="PhysicalOperator" type="PhysicalOperatorType" minOccurs="1" maxOccurs="1"/>
    </xs:sequence>
  </xs:complexType>
  <xs:simpleType name="LogicalOperatorType">
    <xs:restriction base="xs:string">
      <xs:enumeration value="Collapse" />
      <xs:enumeration value="Concatenation" />
      <xs:enumeration value="Constant Scan" />
      <xs:enumeration value="Delay" />
      <xs:enumeration value="Broadcast" />
      <xs:enumeration value="Gather Streams" />
      <xs:enumeration value="Repartition Streams" />
      <xs:enumeration value="Distribute Streams" />
      <xs:enumeration value="Segment Repartition" />
      <xs:enumeration value="Branch Repartition" />
      <xs:enumeration value="Filter" />
      <xs:enumeration value="Assert" />
      <xs:enumeration value="LogRowScan" />
      <xs:enumeration value="Print" />
      <xs:enumeration value="Compute Scalar" />
      <xs:enumeration value="Merge Interval" />
      <xs:enumeration value="Rank" />
      <xs:enumeration value="Segment" />
      <xs:enumeration value="Sequence" />
      <xs:enumeration value="Split" />
      <xs:enumeration value="Aggregate" />
      <xs:enumeration value="Table Scan" />
      <xs:enumeration value="Clustered Index Scan" />
      <xs:enumeration value="Clustered Index Seek" />
      <xs:enumeration value="Deleted Scan" />
      <xs:enumeration value="Inserted Scan" />
      <xs:enumeration value="Parameter Table Scan" />
      <xs:enumeration value="Index Scan" />
      <xs:enumeration value="Index Seek" />
      <xs:enumeration value="Remote Scan" />
      <xs:enumeration value="Remote Query" />
      <xs:enumeration value="Remote Insert" />
      <xs:enumeration value="Remote Update" />
      <xs:enumeration value="Remote Delete" />
      <xs:enumeration value="Clustered Update" />
      <xs:enumeration value="Distinct Sort" />
      <xs:enumeration value="Sort" />
      <xs:enumeration value="TopN Sort" />
      <xs:enumeration value="Eager Spool" />
      <xs:enumeration value="Lazy Spool" />
      <xs:enumeration value="Update " />
      <xs:enumeration value="Insert" />
      <xs:enumeration value="Delete" />
      <xs:enumeration value="Workfile Scan" />
      <xs:enumeration value="Top" />
      <xs:enumeration value="Distinct" />
      <xs:enumeration value="Flow Distinct" />
      <xs:enumeration value="Cache" />
      <xs:enumeration value="Partial Aggregate" />
      <xs:enumeration value="InnerJoin" />
      <xs:enumeration value="Left Outer Join" />
      <xs:enumeration value="Right Outer Join" />
      <xs:enumeration value="Full Outer Join" />
      <xs:enumeration value="Left Semi Join" />
      <xs:enumeration value="Left Anti Sem iJoin " />
      <xs:enumeration value="Right Semi Join" />
      <xs:enumeration value="Right Anti Semi Join" />
      <xs:enumeration value="Intersect" />
      <xs:enumeration value="Intersect All" />
      <xs:enumeration value="Union" />
      <xs:enumeration value="Left Diff" />
      <xs:enumeration value="Left Diff All" />
      <xs:enumeration value="Right Diff" />
      <xs:enumeration value="Right Diff All" />
      <xs:enumeration value="Anti Diff" />
      <xs:enumeration value="Cross Join" />
```

TABLE 1-continued

```
      <xs:enumeration value="Bitmap Create" />
      <xs:enumeration value="UDX" />
      <xs:enumeration value="Switch" />
    </xs:restriction>
  </xs:simpleType>
  <xs:simpleType name="PhysicalOperatorType">
    <xs:restriction base="xs string">
      <xs:enumeration value="Collapse" />
      <xs:enumeration value="Concatenation" />
      <xs:enumeration value="Constant Scan" />
      <xs:enumeration value="Delay" />
      <xs:enumeration value="Parallelism" />
      <xs:enumeration value="Filter" />
      <xs:enumeration value="Assert" />
      <xs:enumeration value="Hash Match" />
      <xs:enumeration value="Log Row Scan" />
      <xs:enumeration value="Merge Join" />
      <xs:enumeration value="Nested Loops" />
      <xs:enumeration value="Print" />
      <xs:enumeration value="Compute Scalar" />
      <xs:enumeration value="Merge Interval" />
      <xs:enumeration value="Rank" />
      <xs:enumeration value="Row Count Spool" />
      <xs:enumeration value="Segment" />
      <xs:enumeration value="Sequence" />
      <xs:enumeration value="Split" />
      <xs:enumeration value="Stream Aggregate" />
      <xs:enumeration value="Table Scan" />
      <xs:enumeration value="Clustered Index Scan" />
      <xs:enumeration value="Clustered Index Seek" />
      <xs:enumeration value="Deleted Scan" />
      <xs:enumeration value="Inserted Scan" />
      <xs:enumeration value="Parameter Table Scan" />
      <xs:enumeration value="Index Scan" />
      <xs:enumeration value="Index Seek" />
      <xs:enumeration value="Remote Scan" />
      <xs:enumeration value="Remote Query" />
      <xs:enumeration value="Remote Insert" />
      <xs:enumeration value="Remote Update" />
      <xs:enumeration value="Remote Delete" />
      <xs:enumeration value="Clustered Update" />
      <xs:enumeration value="Sort" />
      <xs:enumeration value="Table Spool" />
      <xs:enumeration value="Index Spool" />
      <xs:enumeration value="Table Update" />
      <xs:enumeration value="Table Insert" />
      <xs:enumeration value="Table Delete" />
      <xs:enumeration value="Index Update" />
      <xs:enumeration value="Index Insert" />
      <xs:enumeration value="Index Delete" />
      <xs:enumeration value="Clustered Index Update" />
      <xs:enumeration value="Clustered Index Insert" />
      <xs:enumeration value="Clustered Index Delete" />
      <xs:enumeration value="Workfile Scan" />
      <xs:enumeration value="Top" />
      <xs:enumeration value="Bitmap" />
      <xs:enumeration value="UDX" />
      <xs:enumeration value="Switch" />
    </xs:restriction>
  </xs:simpleType>
  <xs:simpleType name="LogicalOperatorEnumType">
    <xs:restriction base="xs:string">
      <xs:enumeration value="" />
      <xs:enumeration value="" />
    </xs:restriction>
  </xs:simpleType>
  <!--
***********************************************************************
** Object Types. Following objects are defined below.
** Server, Database, Table, Column, Index, Materialized view, Stored Procedure
***********************************************************************
-->
  <xs:complexType name="ServerType">
    <xs:sequence>
      <xs:element name="Name" type="NameType" />
    </xs:sequence>
  </xs:complexType>
  <xs:complexType name="DatabaseType">
    <xs:sequence>
```

TABLE 1-continued

```
      <xs:element name="Name" type="NameType" />
      <xs:element name="Server" type="ServerType" minOccurs="0" />
    </xs:sequence>
  </xs:complexType>
  <xs:complexType name="OwnerType">
    <xs:sequence>
      <xs:element name="Name" type="NameType" />
      <xs:element name="Server" type="ServerType" minOccurs="0" />
      <xs:element name="Database" type="DatabaseType" minOccurs="0" />
    </xs:sequence>
  </xs:complexType>
  <xs:complexType name="TableType">
    <xs:sequence>
      <xs:element name="Name" type="NameType" />
      <xs:element name="Server" type="ServerType" minOccurs="0" />
      <xs:element name="Database" type="DatabaseType" minOccurs="0" />
      <xs:element name="Owner" type="DatabaseType" minOccurs="0" />
    </xs:sequence>
    <xs:attribute name="NumRows" type="xs:unsignedLong" />
  </xs:complexType>
  <xs:complexType name="ViewType">
    <xs:sequence>
      <xs:element name="Name" type="NameType" />
      <xs:element name="Server" type="ServerType" minOccurs="0" />
      <xs:element name="Database" type="DatabaseType" minOccurs="0" />
      <xs:element name="Owner" type="DatabaseType" minOccurs="0" />
    </xs:sequence>
    <xs:attribute name="ViewDefinition" type="xs:string" />
  </xs:complexType>
  <xs:complexType name="ColumnType">
    <xs:sequence>
      <xs:element name="Name" type="NameType" />
      <xs:element name="Server" type=" ServerType" minOccurs="0" />
      <xs:element name="Database" type="DatabaseType" minOccurs="0" />
      <xs:element name="Owner" type="DatabaseType" minOccurs="0" />
      <xs:element name="Table" type="TableType" minOccurs="0" />
    </xs:sequence>
    <xs:attribute name="DataType" type="xs:string" default="int"/>
    <xs:attribute name="Collation" type="EnumCollationType" default="ASC" />
    <xs:attribute name="IsIndexKey" type="IsIndexKeyType" default="no" />
  <xs:complexType>
  <xs:complexType name="IndexType">
    <xs:sequence>
      <xs:element name="Name" type="NameType" />
      <xs:element name="Name" type="NameType" />
      <xs:element name="Server" type="ServerType" minOccurs="0" />
      <xs:element name="Database" type="DatabaseType" minOccurs="0" />
      <xs:element name="Owner" type="DatabaseType" minOccurs="0" />
      <xs:choice>
        <xs:element name="Table" type="TableType" minOccurs="0" />
        <xs:element name="View" type="ViewType" minOccurs="0" />
      </xs:choice>
      <xs:element name="Column" type="ColumnType" minOccurs="1" />
    </xs:sequence>
    <xs:attribute name="ClusteringProperty" type="ClusteringPropertyType"
default="Non Clustered" />
    <xs:attribute name="UniquenessProperty" type="UniquenessPropertyType"
default="Non Unique" />
  </xs:complexType>
  <!--
******************************************
** Boolean type
******************************************
-->
  <xs:simpleType name="BooleanType">
    <xs:restriction base="xs:unsignedInt">
      <xs:minInclusive value="0" />
      <xs:maxInclusive value="1" />
    </xs:restriction>
  </xs:simpleType>
  <!--
******************************************
** Simple Types
******************************************
-->
  <xs:simpleType name="EnumStatementCategory">
    <xs:restriction base="xs:string">
      <xs:enumeration value="SELECT" />
      <xs:enumeration value="UPDATE" />
```

TABLE 1-continued

```
        <xs:enumeration value="INSERT" />
        <xs:enumeration value="DELETE" />
      </xs:restriction>
    </xs:simpleType>
    <xs:simpleType name="EnumCollationType">
      <xs:restriction base="xs:string">
        <xs:enumeration value="ASC" />
        <xs:enumeration value="DESC" />
      </xs:restriction>
    </xs:simpleType>
    <xs:simpleType name="ClusteringPropertyType">
      <xs:restriction base="xs:string">
        <xs:pattern value="Non Clustered" />
        <xs:pattern value="Clustered" />
        <xs:pattern value="Unique" />
      </xs:restriction>
    </xs:simpleType>
    <xs:simpleType name="UniquenessPropertyType">
      <xs:restriction base="xs:string">
        <xs:pattern value="Non Unique" />
        <xs:pattern value="Unique" />
      </xs:restriction>
    </xs:simpleType>
    <xs:simpleType name="IsIndexKeyType">
      <xs:restriction base="xs:string">
        <xs:enumeration value="no" />
        <xs:enumeration value="yes" />
      </xs:restriction>
    </xs:simpleType>
    <xs:simpleType name="NameType">
      <xs:restriction base="xs:string">
        <xs:pattern value="[a-zA-Z#_][a-zA-Z0-9_]+" />
      </xs:restriction>
    </xs:simpleType>
</xs:schema>
```

As can be seen from the WorkloadAnalysis.xsd file in Table 1, the schema consists of identifying tags that are placed around information of interest for workload analysis. For example, the following information is included in the XML file version of the structured workload information (SWI) 222 with respect to the syntactic analysis of a workload event: SQL string for the statement, a statement category, a list of tables and columns referenced or updated by the statement, a list of Projection columns, a list of Group By columns, a list of Order By columns, and a list of predicates trees consisting of AND/OR/NOT of atomic join and selection conditions.

The following plan information for the statement is included in the XML structured workload information (SWI) 222: total optimizer estimated cost of executing the statement, estimated cardinality of the output of the statement, and a sequence of logical and physical operators and their arguments used in the plan. Execution information including the actual cost of executing the statement and the actual cardinality of the output of the statement are also stored in the structured workload information (SWI) 222 by the SWI populator 216.

As can be seen from the foregoing description, a structured workload information (SWI) can be created that facilitates ad hoc analysis by relatively unskilled operators. The structured workload information can feature workload information according to a variety of schemas such as a relational format, OLAP, or XML. The schema may be selected based on the end user's analysis technique. Although the present invention has been described with a degree of particularity, it is the intent that the invention include all modifications and alterations from the disclosed design falling within the spirit or scope of the appended claims.

We claim:

1. In a relational database system upon which a query is executed, the relational database system having a workload comprising a series of logged queries and associated query information, a computer-implemented method for populating a structured workload information data structure to facilitate a given usage of workload information by an end user, the method comprising the steps of:

extracting the query information from the workload;
   selecting a predetermined schema from among a plurality of predetermined schema wherein the predetermined schema is one of a relational database schema, an OLAP schema, and an XML schema; and
   using the selected predetermined schema to transform the query information into the structured workload information data structure as defined by the selected predetermined schema, and storing the structured workload information data structure.

2. The method of claim 1 wherein the predetermined schema is selected based on the given usage of the workload information.

3. The method of claim 1 wherein the predetermined schema is hierarchical in nature, and objects in the schema are arranged in dimensions wherein objects in a dimension are ordered based on a degree of granularity.

4. The method of claim 1 further comprising the step of storing the query information in a relational database.

5. The method of claim 4 wherein the query information is organized as a central fact table and a collection of hierarchical dimension tables.

6. The method of claim 1 wherein the predetermined schema is an OLAP schema for arranging the query information in an OLAP cube.

7. The method of claim 6 wherein the OLAP cube comprises hierarchical dimensions with the query information being arranged in the hierarchical dimensions, the arranged query information having objects ordered as a function of granularity.

8. The method of claim 6 wherein the OLAP cube has a dimension for at least one of the following types of query information in the database workload: data objects accessed by the query, a time the query occurred, a user submitting the query, a machine on which the query was submitted, a type of query, physical operators included in the query or an associated query plan, and a nature of predicates in the query.

9. The method of claim 1 wherein the step of extracting information from the workload is performed by accessing a query plan for each query of the series of logged queries in the workload.

10. The method of claim 1 wherein the query information comprises a plurality of units of information and the step of storing the query information includes appending identifying tags to each of the plurality of units of information.

11. The method of claim 10 wherein the identifying tags are XML tags, and wherein the XML tags identify at least one of the following types of workload information: a SQL string for the query, a query category, a list of tables and columns referenced or updated by the query, a total optimizer estimated cost, an estimated cardinailty of the query, and a sequence of logical and physical operators including arguments used irra query plan.

12. An apparatus for use on a relational database system upon which a query is executed, the relational database system having a workload comprising a series of logged queries and associated query information, the apparatus for populating a structured workload information data structure to facilitate a given usage of workload information by an end user, the apparatus comprising:
    an information extractor for extracting query information from the workload; and
    a structured workload information populator for storing the query information in the structured workload information data structure, where the query information is transformed into the structured workload data structure using a schema wherein the svhema is one of a relational database schema, an OLAP schema, and an XML schema, and where the structured workload information populator is configured to be able perform the transforming.

13. The apparatus of claim 12 further comprising an information loader for storing the query information in a relational database.

14. The apparatus of claim 12 wherein the structured workload information (SWI) populator stores the query information according to a predetermined schema, the predetermined schema being hierarchical in nature.

15. The apparatus of claim 12 wherein the structured workload information populator stores the query information as one or more units of information having identifying tags appended thereto, and wherein the identifying tags indicate a type of query information contained in each of the one or more units of information.

16. A computer readable medium embodied data structure for facilitating analysis of workload information regarding a workload for a database, wherein:
    the workload comprises a set of logged queries and associated query information, the logged queries having been executed against the database;
    the data structure includes a first data field representing a first dimension, the first data field containing a first data element representing a first type of the query information, the first data element arranged in a hierarchy based on a level of granularity of the query information represented in the first dimension;
    the data structure includes a second data field representing a second dimension, the second data field containing a second data element representing a second type of the query information, the second data element arranged in a hierarchy based on the level of granularity of the query information represented in the second dimension: and,
    the data structure imposes a physical structure on the first data element and the second data element to facilitate analysis of workload information.

17. The computer readable medium of claim 16 wherein the first type of query information is a time a query occurred and the hierarchy of the first dimension ranges from year to millisecond.

18. A computer readable medium having instructions stored thereon for performing computer-implemented method steps for populating a structured workload information data structure to facilitate a given end usage of workload information regarding a workload for a relational database system upon which a query is executed, wherein the workload comprises a series of logged queries and associated query information, the method steps comprising:
    extracting the query information from the workload;
    selecting a predetermined schema from among a plurality of predetermined schema wherein the predetermined schema is one of a relational database schema, an OLAP schema, and an XML schema; and
    using the selected predetermined schema to transform the query information into the structured workload information data structure as defined by the selected predetermined scheme, and storing the structured workload information data structure.

19. The computer readable medium of claim 18 wherein the predetermined schema is selected based on the given end usage of the workload information.

20. The computer readable medium of claim 18 wherein the predetermined schema is hierarchical in nature, and objects in the schema are arranged in dimensions wherein objects in a dimension are ordered based on a degree of granularity.

21. The computer readable medium of claim 18 wherein the method further comprises the step of storing the query information in a relational database.

22. The computer readable medium of claim 21 wherein the query information is organized as a central fact table and a collection of hierarchical dimension tables.

23. The computer readable medium of claim 18 wherein the predetermined schema is an OLAP schema for arranging query information in an OLAP cube.

24. The computer readable medium of claim 23 wherein the OLAP cube comprises hierarchical dimensions, and wherein the query information is arranged in the hierarchical dimensions, the arranged query information having objects ordered as a function of granularity.

25. The computer readable medium of claim 23 wherein the OLAP cube has a dimension for at least one of the following types of query information for each of the series of logged queries in the workload: a data object accessed by the query, a time the query occurred, a user submitting the query, a machine on which the query was submitted, a type of query, a list of physical operators included in the query or an associated query plan, and a nature of predicates in the query.

26. The computer readable medium of claim 18 wherein the step of extracting information from the workload is performed by accessing a query plan for each query of the series of logged queries in the workload.

27. The computer readable medium of claim 18 wherein the query information comprises a plurality of units of information and the step of storing the query information includes appending identifying tags to each of the plurality of units of information.

28. The computer readable medium of claim 27 wherein the identifying tags are XML tags, and wherein the XML tags identify at least one of the following types of workload information: a SQL string for the query, a query category, a list of tables and columns referenced or updated by the query, a total optimizer estimated cost, an estimated cardinality of the query, and a sequence of logical and physical operators including arguments used in a query plan.

29. A schema embodied on a computer readable medium for structuring workload information regarding a workload for a database, into structured workload information data structures that are structured to allow multi-dimensional analysis of the workload, where a structured workload information data structure comprises a plurality of dimensions organizing query information in a hierarchical fashion according to a level of granularity of the query information; wherein the schema imposes a physical structure on the workload information to facilitate a multi-dimensional analysis of the workload.

30. The schema of claim 29, further comprising a dimension for at least one of the following types of query information in the workload: a data object accessed by a query, a time the query occurred, a user submitting the query, a machine on which the query was submitted, a type of query, a list of physical operators included in the query or an associated query plan, and a nature of predicates in the query.

31. A schema embodied on a computer readable medium structuring workload information regarding a workload for a database, into structured workload information data structures so as to facilltate exchange of the workload information between computers, the schema comprising:

identifying tags that are appended to workload information, wherein the identifying tags are XML tags, and wherein the XML tags identify at least one of the following types of workload information: a SQL string for the query, a query category, a list of tables and columns referenced or updated by the query, a total optimizer estimated cost, an estimated cardinality of the query, and a sequence of logical and physical operators including arguments used in a query plan; wherein the schema imposes a physical organization on the workload information to facilitate exchange of the workload information between computers.

* * * * *